United States Patent
Lee et al.

(10) Patent No.: US 8,958,491 B2
(45) Date of Patent: Feb. 17, 2015

(54) RECEIVING DEVICE OF OFDM COMMUNICATION SYSTEM AND METHOD FOR ALLEVIATING PHASE NOISE THEREOF

(75) Inventors: Myung Kyu Lee, Pohang-si (KR); Kyeong Cheol Yang, Pohang-si (KR); Seung Chan Lim, Jeju-si (KR)

(73) Assignee: Postech Academy-Industry Foundation, Pohang-Si, Gyeongsangbuk-Do (KR)

( * ) Notice: Subject to any disclaimer, the term of this patent is extended or adjusted under 35 U.S.C. 154(b) by 0 days.

(21) Appl. No.: 14/237,779

(22) PCT Filed: Aug. 8, 2012

(86) PCT No.: PCT/KR2012/006294
§ 371 (c)(1),
(2), (4) Date: Feb. 7, 2014

(87) PCT Pub. No.: WO2013/022270
PCT Pub. Date: Feb. 14, 2013

(65) Prior Publication Data
US 2014/0205030 A1    Jul. 24, 2014

(30) Foreign Application Priority Data
Aug. 9, 2011    (KR) .................. 10-2011-0079128

(51) Int. Cl.
*H04K 1/10*   (2006.01)
*H04L 27/28*   (2006.01)
*H04L 25/03*   (2006.01)
*H04L 27/26*   (2006.01)

(52) U.S. Cl.
CPC ...... *H04L 25/03821* (2013.01); *H04L 27/2657* (2013.01); *H04L 27/2691* (2013.01); *H04L 27/2601* (2013.01)
USPC ........... 375/260; 375/267; 375/346; 375/371; 370/208; 370/210

(58) Field of Classification Search
USPC ........... 370/203–211; 375/260, 267, 346, 371
See application file for complete search history.

(56) References Cited

U.S. PATENT DOCUMENTS

2009/0232257 A1*   9/2009   Bury ........................... 375/341

FOREIGN PATENT DOCUMENTS

| KR | 10-2004-0006657 | 1/2004 |
| KR | 10-2006-0071084 | 6/2006 |
| KR | 10-2007-0014583 | 2/2007 |

OTHER PUBLICATIONS

International Search Report for International Application No. PCT/KR2012/006294, dated Feb. 25, 2013.
Yu Gong et al., "OFDM Joint Data Detection and Phase Noise Cancellation for Constant Modulus Modulations", IEEE Transactions on Signal Processing, vol. 57, No. 7, pp. 2864-2868, Jul. 2009.
PCT Written Opinion of the International Searching Authority of International Application No. PCT/KR2012/006294, dated Feb. 25, 2013.

\* cited by examiner

*Primary Examiner* — Curtis Odom
(74) *Attorney, Agent, or Firm* — Kile Park Reed & Houtteman PLLC

(57) ABSTRACT

The present invention relates to a receiving apparatus in an OFDM communication system and a phase noise mitigation method thereof which are configured to estimate and compensate for phase noise from a received OFDM symbol, unlike the conventional receiver which uses a pilot symbol for mitigating phase noise, and thus can improve the transmission efficiency and error rate performance in an OFDM system.

11 Claims, 6 Drawing Sheets

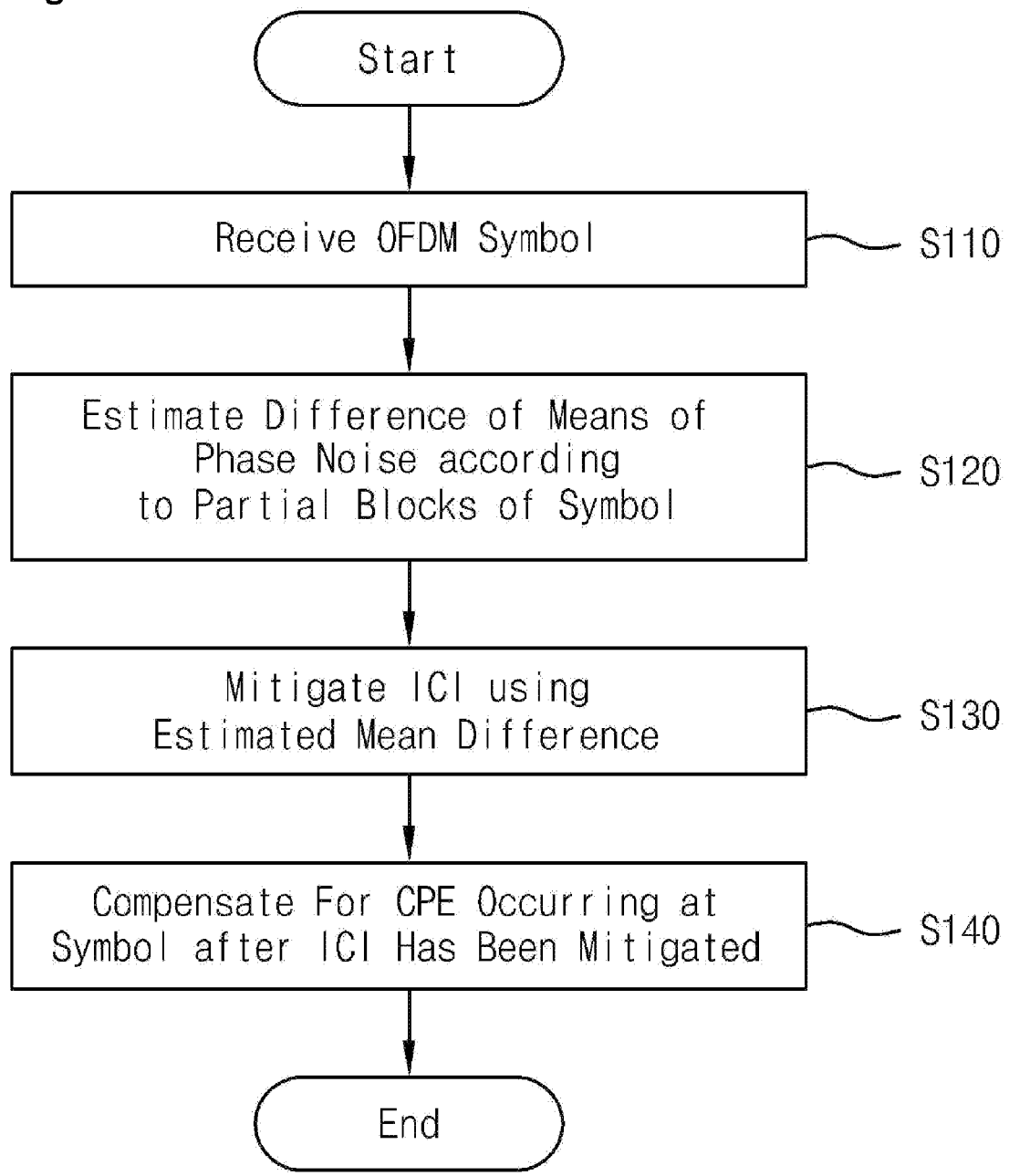

RECEIVING DEVICE OF OFDM COMMUNICATION SYSTEM AND METHOD FOR ALLEVIATING PHASE NOISE THEREOF

BACKGROUND OF THE INVENTION

1. Technical Field

The present invention relates to wireless communication, and more particularly, to a receiving apparatus for mitigating phase noise in an orthogonal frequency division multiplexing (hereinafter, referred to as "OFDM") communication system, and a method for the same.

2. Background Art

The OFDM has been widely adopted as a transmission standard for a next-generation broadband communication system because the OFDM is robust against multipath fading and has a low implementation complexity.

However, since the error rate performance of an OFDM receiver is easily deteriorated by intercarrier interference (hereinafter, referred to as "ICI") and common phase error (hereinafter, referred to as "CPE"), which are caused by phase noise and frequency deviation (offset), it is necessary to effectively compensate for such distortion components.

In order to mitigate the effects of phase noise, most receivers require the transmission of pilot symbols.

However, the transmission of such pilot symbols reduces the transmission efficiency in an OFDM system. In order to solve such a problem, a number of studies have recently been made on a phase noise mitigation method requiring no transmission of a pilot symbol, i.e. using a blind scheme.

A recent result for a receiver having a phase noise mitigator of a blind scheme is a C-MMSPE algorithm, which was proposed in document "OFDM joint data detection and phase noise cancellation for constant modulus modulations", IEEE Transactions on Signal Processing, pp. 2864-2868, July 2009.

The C-MMSPE algorithm can efficiently compensate for phase noise when the intensity of the phase noise is small or when a low-order modulation scheme is used, while the C-MMSPE algorithm shows serious performance degradation when the intensity of the phase noise is large or when a high-order modulation scheme is used.

The C-MMSPE algorithm is to estimate a transmitted symbol using a received symbol, in which ICI has not been mitigated at all, and to estimate phase noise with the symbol estimation value.

In this case, when the ICI exerts a large effect, the symbol estimation value becomes inaccurate, and thus the phase noise also is inaccurately estimated, so that the performance of the C-MMSPE algorithm is degraded.

DISCLOSURE

Technical Problem

Accordingly, the present invention has been made in an effort to solve the problems occurring in the related art, and an object of the present invention is to provide a receiving apparatus capable of improving transmission efficiency and error performance of an OFDM system by estimating and compensating for phase noise from a received OFDM symbol in an OFDM communication system, unlike a conventional receiving apparatus which uses a pilot symbol to mitigate phase noise, and a phase noise mitigation method thereof.

Technical Solution

In order to achieve the above object, according to one aspect of the present invention, there is provided a receiving apparatus in an OFDM communication system, the receiving apparatus including: a communication unit for receiving an OFDM symbol from a transmitting apparatus in the OFDM communication system; an intercarrier interference (hereinafter, referred to as "ICI") mitigation unit for estimating a mean difference of phase noise according to partial blocks of the received symbol, and mitigating ICI occurring at the symbol using the estimated mean difference; and a common phase error (hereinafter, referred to as "CPE") compensation unit for estimating and compensating for a CPE occurring at the symbol after the ICI is mitigated by the ICI mitigation unit.

In this case, the ICI mitigation unit may use a blind scheme to estimate the mean difference of phase noise according to the partial blocks.

In addition, the ICI mitigation unit may use at least one among a discrete Fourier coefficient according to the partial blocks, an amplitude of a channel coefficient, and an amplitude of a transmission component to estimate the mean difference of phase noise according to the partial blocks. In this case, the ICI mitigation unit may apply a least-squares algorithm to the discrete Fourier coefficient according to the partial blocks, the amplitude of the channel coefficient, and the amplitude of the transmission component to estimate the mean difference of phase noise according to the partial blocks.

In addition, the ICI mitigation unit may multiply each of the partial blocks of the symbol by a value corresponding to the estimated mean difference to mitigate the ICI.

The ICI mitigation unit may include: a received symbol divider for dividing the received symbol into the partial blocks; an estimator for calculating each of means of phase noise of the divided partial blocks, and estimating a mean difference of phase noise according to the partial blocks with respect to the calculated each phase noise mean; and an operator for mitigating the ICI by multiplying each of the partial blocks by a value corresponding to the mean difference which is estimated by the estimator.

In addition, according to another aspect of the present invention, there is provided a method for mitigating phase noise of a receiving apparatus in an OFDM communication system, the method including: receiving an OFDM symbol from a transmitting apparatus in the OFDM communication system; estimating a mean difference of phase noise according to partial blocks of the received symbol; mitigating intercarrier interference (hereinafter, referred to as "ICI") occurring at the symbol using the estimated mean difference; and estimating and compensating for a common phase error (hereinafter, referred to as "CPE") occurring at the symbol after the ICI is mitigated at the symbol.

Advantageous Effects

According to the embodiment of the present invention, the receiving apparatus in the OFDM communication system and the phase noise mitigation method thereof do not use an existing pilot symbol at all, so that the transmission efficiency of the system can be significantly improved. In addition, according to the embodiment of the present invention, since common phase error (CPE) is compensated for after intercarrier interference (ICI) is first removed, the performance of the system can be remarkably improved.

BRIEF DESCRIPTION OF THE DRAWINGS

The above objects, and other features and advantages of the present invention will become more apparent after a reading of the following detailed description taken in conjunction with the drawings, in which:

FIG. 6 is a flowchart illustrating a procedure in which a receiving apparatus mitigates phase nose in an OFDM communication system according to an embodiment of the present invention.

BEST MODE FOR THE INVENTION

Figure 1:
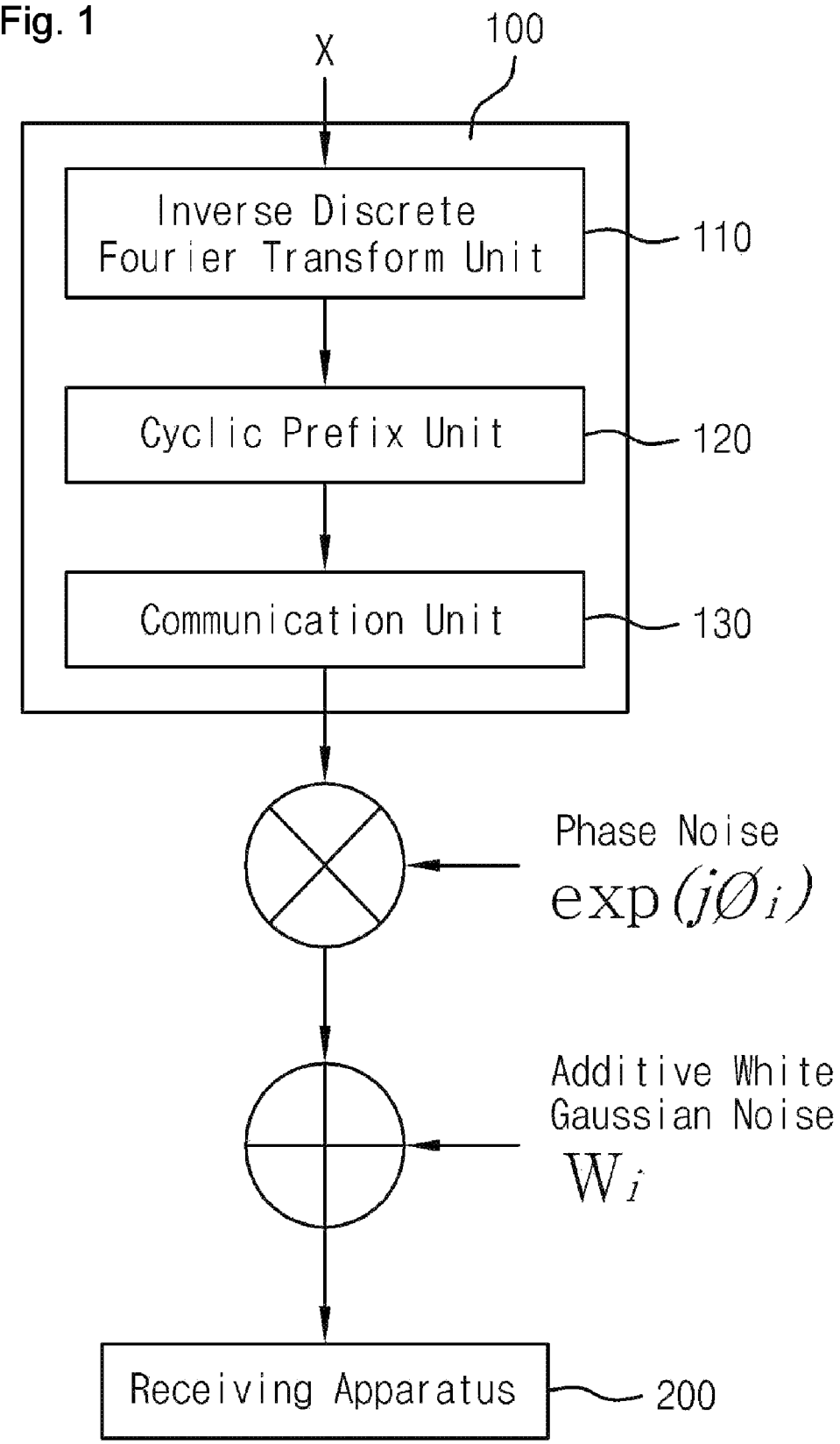
FIG. 1 is a block diagram illustrating the configuration of an OFDM communication system according to an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a block diagram illustrating the configuration of an OFDM communication system according to an embodiment of the present invention.

Referring to FIG. 1, an OFDM communication system is configured to include a transmitting apparatus 100 for transmitting an OFDM symbol including information, and a receiving apparatus 200 for receiving the OFDM symbol transmitted from the transmitting apparatus 100.

For example, the receiving apparatus 200 may be a mobile terminal, and the transmitting apparatus 100 may be a base station, a broadcasting station, or the like, which broadcasts OFDM symbols to the mobile terminal.

In addition, the mobile terminal may include a cellular phone, a smart phone, a laptop computer, a terminal for digital broadcasting, a personal digital assistant (PDA), a portable multimedia player (PMP), a navigation terminal, or the like.

In addition, the receiving apparatus 200 may be a fixed terminal, such as a digital TV, a desktop computer, or the like.

Meanwhile, the transmitting apparatus 100 is configured to include an inverse discrete Fourier transform unit (hereinafter, referred to as an "IDFT") 110, a cyclic prefix (hereinafter, referred to as a "CP") insertion unit 120, and a communication unit 130.

Here, the transmitting apparatus 100 according to an embodiment of the present invention does not transmit a pilot symbol for estimation of phase noise.

That is to say, one OFDM communication system includes N number of subcarriers. In this case, when a component to be transmitted through a $k^{th}$ subcarrier is referred to as $X_k$, an information-word symbol vector X to be transmitted is expressed as equation 1 below.

$$X = [X_0, X_1, \ldots, X_{N-1}]^T \qquad (1)$$

Here, $[\cdot]^T$ represents a transpose operation.

The IDFT 110 performs an N-point inverse discrete Fourier transform to normalize the information-word symbol vector X, wherein the inverse transformation transforms the information-word symbol vector X into a time-domain information-word symbol vector $x = [x_0, x_1, \ldots, x_{N-1}]^T$.

In addition, the IDFT 110 outputs the inverse-transformed information-word symbol vector X to the CP insertion unit 120.

The CP insertion unit 120 adds a CP to the information-word symbol vector X inputted from the IDFT 110, and outputs the CP-added information-word symbol vector X to the communication unit 130.

The communication unit 130 transmits the information-word symbol vector X, which has been inputted from the CP insertion unit 120, to the receiving apparatus 200 through a transmission channel appointed with the receiving apparatus 200.

In this case, when the receiving apparatus 200 receives the symbol vector X from the transmitting apparatus 100, phase noise and/or additive white Gaussian noise (AWGN) occurs at the received symbol vector X.

Hereinafter, the configuration of the receiving apparatus 200 according to an embodiment of the present invention will be described in detail with reference to FIG. 2.

Figure 2:
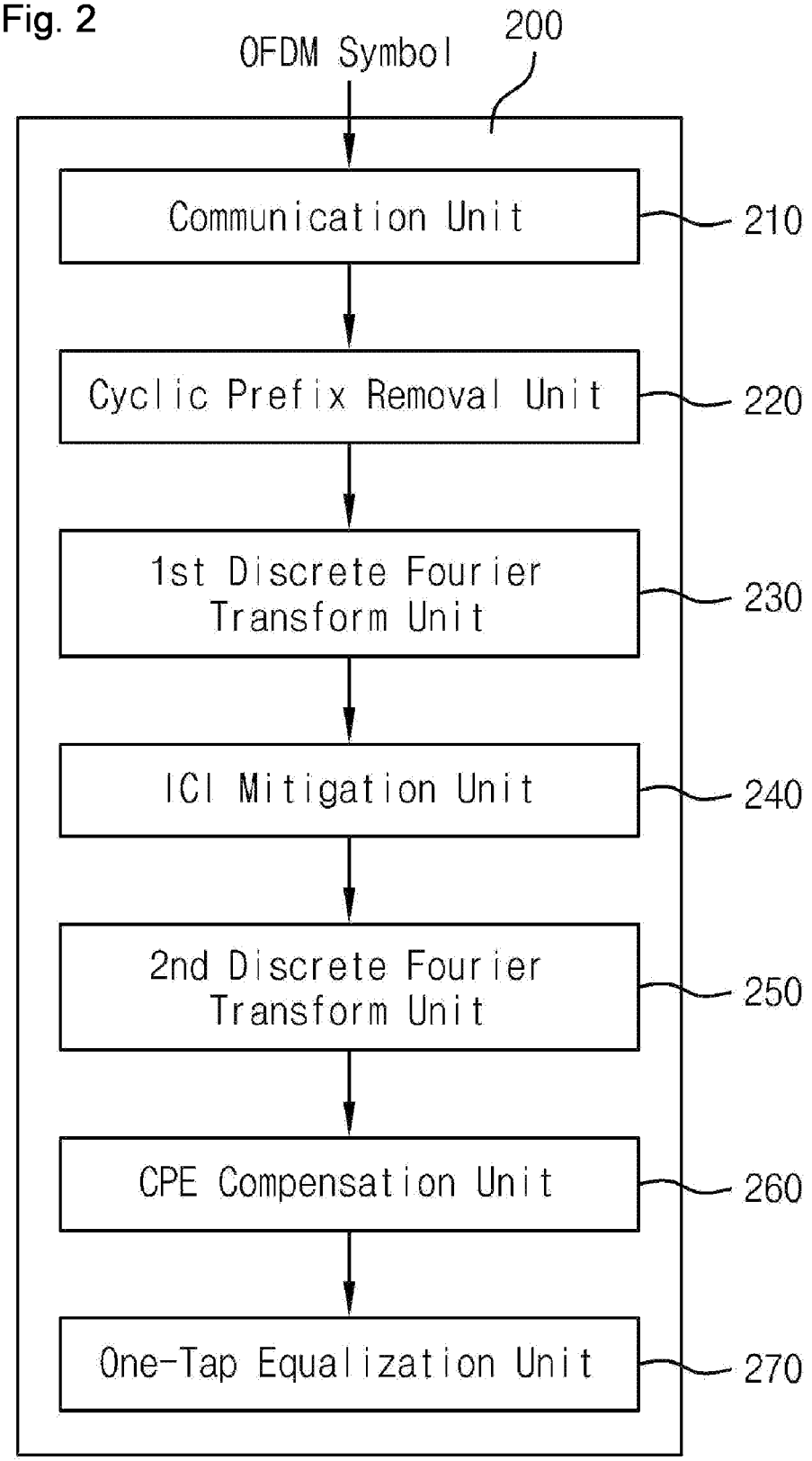
FIG. 2 is a block diagram illustrating the configuration of a receiving apparatus in an OFDM communication system according to an embodiment of the present invention.

FIG. 2 is a block diagram illustrating the configuration of a receiving apparatus in an OFDM communication system according to an embodiment of the present invention.

Referring to FIG. 2, the receiving apparatus 200 is configured to include a communication unit 210, a cyclic prefix removal unit 220, first and second discrete Fourier transform units 230 and 250, respectively, an intercarrier interference (ICI) mitigation unit 240, a common phase error (Hereinafter, referred to as "CPE") compensation unit 260, and a one-tap equalization unit 270.

In this case, the receiving apparatus 200 according to an embodiment of the present invention may be configured to include, for example, a display unit, an input unit, a speaker, and the like when the receiving apparatus is a mobile terminal, in addition to the aforementioned constituent elements according to necessity. However, matters, except for the aforementioned constituent elements, have no direct relation to the present invention, so a detailed description thereof will be omitted for simplification of description.

The receiving apparatus 200 according to an embodiment of the present invention estimates a mean of phase noise, which occur at a symbol received from the transmitting apparatus 100, in a blind scheme according to partial blocks of the symbol, using a discrete Fourier coefficient of the received symbol, the amplitude of a channel coefficient with the transmitting apparatus 100, and the amplitude of a transmission component; and mitigates ICI caused by the phase noise, first of all, using the estimated mean.

Then, the receiving apparatus 200 again estimates and compensates for a CPE which additionally occurs at the symbol, where the ICI has first been mitigated. Accordingly, unlike the conventional receiving apparatus for compensation of phase noise, the receiving apparatus 200 according to an embodiment of the present invention estimates and compensates for phase noise without using a pilot symbol, so that the transmission efficiency of the OFDM communication system can be improved.

In addition, since the receiving apparatus 200 according to an embodiment of the present invention first mitigates ICI caused by phase noise at a received symbol, the error rate of the OFDM communication system can be remarkably reduced.

Hereinafter, the constituent elements of the receiving apparatus 200 according to an embodiment of the present invention will be described in detail.

The communication unit 210 receives a symbol transmitted from the transmitting apparatus 100 through a channel appointed with the transmitting apparatus 100.

The CP removal unit 220 removes a CP from the received symbol. In this case, when the vector of the symbol from which the CP is removed by the CP removal unit 220 is defined as $y=[y_0, y_1, \ldots, y_{N-1}]^T$, an $i^{th}$ received component $y_i$ of the vector y of the symbol is expressed as equation 2 below.

$$y_i = \exp(j\phi_i) \sum_{l=0}^{L-1} h_l x_{\langle i-l \rangle} + w_i, \quad (2)$$
$$i = 0, 1, \ldots, N-1$$

Here, $\phi_i$ represents phase noise occurring in an $i^{th}$ received component section, and $\langle \cdot \rangle_N$ represents a modulo-N operation.

In addition, coefficient $w_i$ represents an additive white Gaussian noise (AWGN), which is a Gaussian random variable with mean zero and variance $\sigma_w^2$.

In addition, coefficient $\{h_i\}_{i=0}^{L-1}$ represents an equivalent discrete-time channel impulse response with length L.

In this case, it is assumed that the channel impulse response is fixed while one symbol is being transmitted, and has been accurately informed to the receiving apparatus.

The first discrete Fourier transform unit 230 calculates the frequency-domain symbol vector $Y=[Y_0, Y_1, \ldots, Y_{N-1}]^T$ of the symbol vector y, from which the CP has been removed, through a normalized N-point discrete Fourier transform (hereinafter, referred to as "DFT").

In this case, a $k^{th}$ component $Y_k$, i.e. a component received through a $k^{th}$ subcarrier, is expressed as equation 3 below.

$$Y_k = H_k X_k J_o + \sum_{n=0, n \neq k}^{N-1} H_n X_n J_{k-n} + W_k, \quad (3)$$
$$k = 0, 1, \ldots, N-1$$

Here, $H_k$ represents a frequency-domain channel coefficient to which a $k^{th}$ subcarrier is subjected, and is expressed as equation 4 below.

$$H_k = \sum_{l=0}^{L-1} h_l \exp\left(-j\frac{2\pi l k}{N}\right) \quad (4)$$

Here, factor $J_k$ represents the frequency-domain component of distortion component $\{\exp(j\phi_i)\}_{i=0}^{N-1}$ caused by phase noise, and is expressed as equation 5 below.

$$J_k = \frac{1}{N}\sum_{i=0}^{N-1} \exp(j\phi_i) \exp\left(-j\frac{2\pi i k}{N}\right) \quad (5)$$

Here, $W_k$ is a $k^{th}$ DFT coefficient of noise $\{w_i\}_{i=0}^{N-1}$, and represents a noise component appearing in a frequency domain. In this case, factor $J_0$ shown at the third term in equation 3 corresponds to a CPE occurring at the received symbol, and the second term in equation 3 corresponds to ICI occurring at the received symbol.

Accordingly, since the components of the received symbol are distorted by the occurring CPE and ICI, it is necessary to compensate for such distortion.

Therefore, the ICI mitigation unit 240 divides the received symbol into a plurality of partial blocks having a size of "s". That is to say, the number of divided partial blocks may be defined as $N_B(=N/S)$.

In this case, a received symbol vector included in a $q^{th}$ partial block may be defined as to $y_q = [y_q, y_{q+1}, \ldots, y_{qS+S-1}]^T$ ($0 \leq q \leq N_B-1$).

In this case, when the mean of phase noise $\{\phi_i\}_{i=qS}^{qS+S-1}$ occurring in the received vector $y_q$ is $\bar{\phi}_q$ ($0 \leq q \leq N_B 1-$), the mean $\bar{\phi}_q$ of the phase noise is expressed as equation 6 below.

$$\bar{\phi}_q = \frac{1}{S}\sum_{i=qS}^{qS+S-1} \phi_i, \quad 0 \leq q \leq N_B - 1 \quad (6)$$

Figure 3:
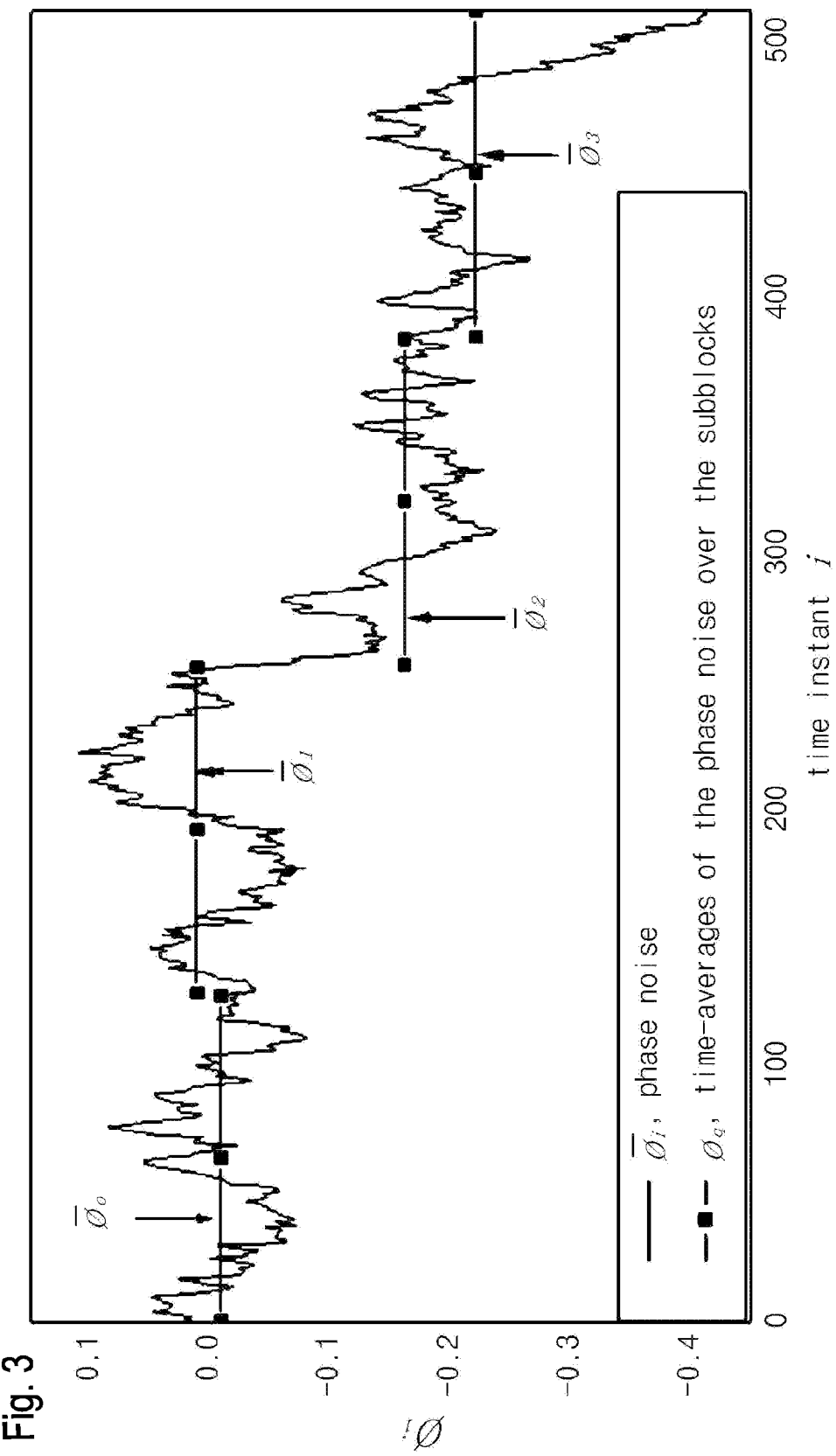
FIG. 3 is a waveform diagram showing a mean of phase noise according to partial blocks in equation 6 and phase noise occurring in an OFDM communication system according to an embodiment of the present invention.

FIG. 3 is a waveform diagram showing a mean of phase noise according to partial blocks in equation 6 and phase noise occurring in an OFDM communication system according to an embodiment of the present invention.

In this case, a difference between the mean $\bar{\phi}_q$ of phase noise occurring at a $q^{th}$ partial block and the mean $\bar{\phi}_0$ of phase noise occurring at a $0^{th}$ partial block is defined as $d_q = \bar{\phi}_1 - \bar{\phi}_0$ ($0 \leq q \leq N_B-1$) a mean difference vector d of phase noise may be defined as equation 7 below using the difference.

$$d = [d_1, d_2, \ldots, d_{N_B-1}]^T \quad (7)$$

That is to say, the ICI mitigation unit 240 performs a zero padding (ZP) operation on the $q^{th}$ partial block vector $y_q$ to make symbol vector $y_{q,ZP}[y_q, y_{q+1}, \ldots, y_{qS+S-1}, 0, \ldots, 0]^T$ ($0 \leq q \leq N_B-1$) having a length of N.

Then, the ICI mitigation unit 240 calculates the normalized N-point DFT coefficient $C_{k,q}$ ($0 \leq k \leq N-1$) of the symbol vector $y_{q,ZP}$, as shown in equation 8 below.

$$C_{k,q} = \frac{1}{\sqrt{N}}\sum_{s=0}^{S-1} y_{qS+s} \exp\left(-j\frac{2\pi s k}{N}\right) \quad (8)$$

In this case, the ICI mitigation unit 240 may infer and be aware of the energy $|X_k|$ ($0 \leq k \leq N-1$) of a transmission component of the transmitting apparatus 100 in advance.

For example, when a signal constellation all components of which have the same energy is used as in a phase shift keying modulation scheme, the receiving apparatus 200 can be directly aware of the energy of a transmission component.

In addition, all components do not have the same energy as in a quadrature amplitude modulation, the energy of a transmission component may be inferred using an equalizer, an energy estimator, or the like.

In this case, with respect to the DFT coefficients $C_{k,q}$ ($0 \leq q \leq N_B-1$, $0 \leq k \leq N-1$) of the partial block symbol vectors, the channel coefficient $H_k$ ($0 \leq k \leq N-1$) of a frequency domain, the energy $|X_k|$ ($0 \leq k \leq N-1$) of a transmission component, and a mean difference vector d of phase noise, a relationship equation may be derived as shown in equation 9 below.

$$r = Ad \quad (9)$$

Here, $r = [r_0, r_1, \ldots, r_{N-1}]^T$ is a vector having a length of N, wherein a $k^{th}$ component is expressed as equation 10 below.

$$r_k = \qquad (10)$$

$$|H_k|^2|X_k|^2 - \sum_{q=0}^{N_B-1} |C_{k,q}|^2 - 2\sum_{q_1=0}^{N_B-1}\sum_{q_2=q_1+1}^{N_B-1} |C_{k,q_1}|^2|C_{k,q_2}|^2 \cos(\theta_{k,q_1,q_2})$$

In this case, $\theta_{k,q_1,q_2}$ is expressed as equation 11 below.

$$\theta_{k,q_1,q_2} = \angle C_{k,q_1} \angle C_{k,q_2} + \frac{2\pi(q_2-q_1)Sk}{N} \pmod{2\pi} \qquad (11)$$

The "A" in equation 9 represents a real matrix having a size of $N \times (N_B-1)$, wherein a component $A_{m,n}$ on an $m^{th}$ row and an $n^{th}$ column is expressed as equation 12 below.

$$A_{m,n} = \qquad (12)$$

$$2\sum_{q=n+2}^{N_B-1} |C_{m,n+1}||C_{m,q}|\sin(\theta_{m,n+1,q}) - 2\sum_{q=0}^{n} |C_{m,n+1}||C_{m,q}|\sin(\theta_{m,q,n+1})$$

In this case, an estimation value $\hat{d}=\{\hat{d}_i\}_{i=1}^{N_B-1}$ of a mean difference vector is calculated as equation 13 below using a least-squares algorithm.

$$\hat{d}=(A^TA)^{-1}A^Tr \qquad (13)$$

That is to say, the ICI mitigation unit 240 mitigates ICI, which has been caused by phase noise in the received symbol, using the estimation value $\{\hat{d}_i\}_{i=1}^{N_B-1}$ of the mean difference vector.

Figure 4:
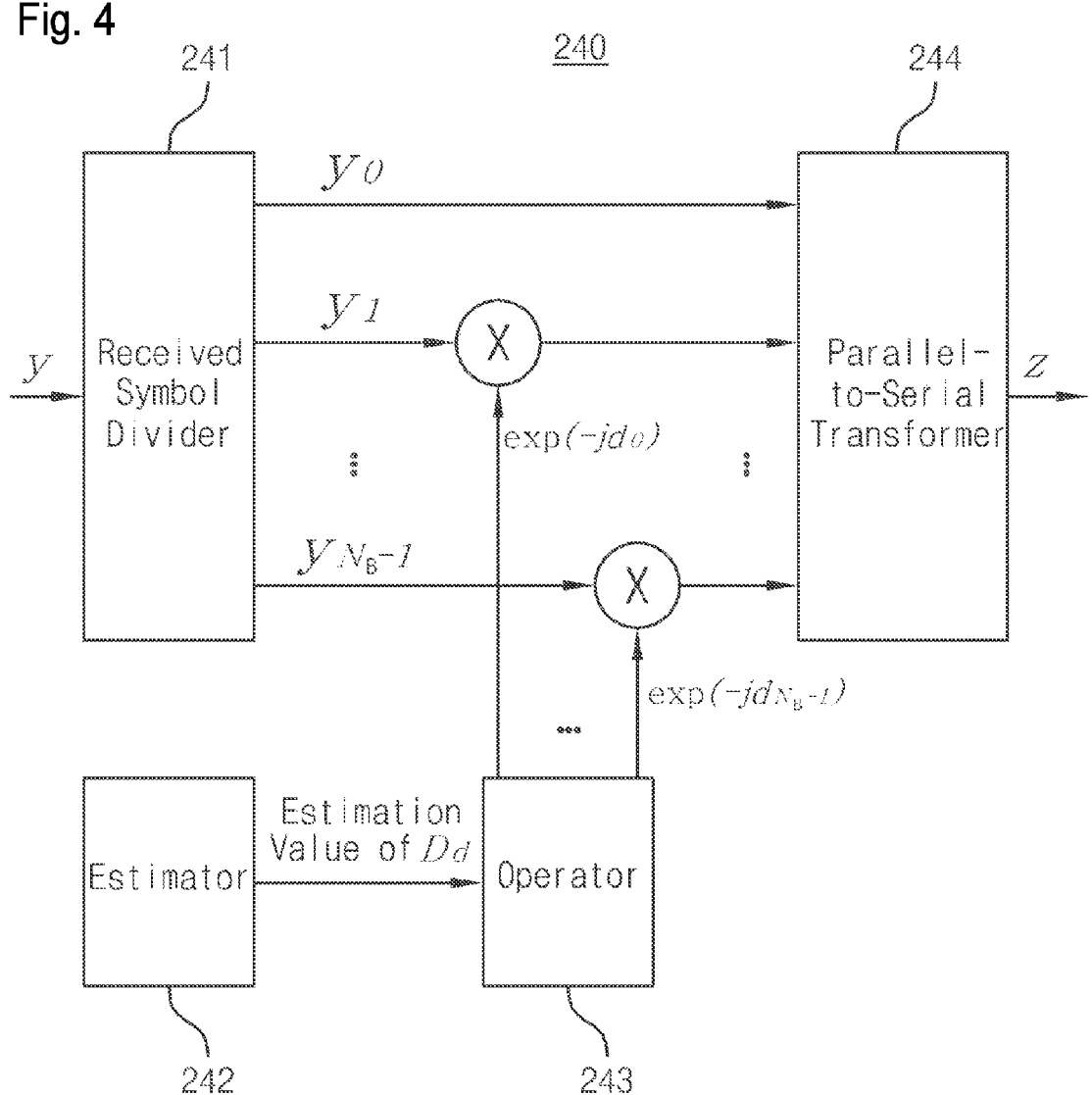
FIG. 4 is a block diagram illustrating the configuration of an ICI mitigation unit according to an embodiment of the present invention.

FIG. 4 is a block diagram illustrating the configuration of the ICI mitigation unit according to an embodiment of the present invention.

Referring to FIG. 4, the ICI mitigation unit 240 is configured, as described above, to include: a received symbol divider 241 for dividing the received symbol into a plurality of partial blocks having a size of "s"; an estimator 242 for calculating the respective means of phase noise according to the divided partial blocks, and estimating a difference of the means of phase noise according to the divided partial blocks on the basis of the calculated respective phase noise means; an operator 243 for multiplying each component of the partial blocks by a value corresponding to the mean difference estimated by the estimator 242, thereby mitigating the ICI; and a parallel-to-serial transformer 244 for transforming the ICI-mitigated partial blocks from parallel blocks to serial blocks and outputting the transformed serial blocks.

That is to say, in order to mitigate the ICI of the partial blocks, the operator 243 multiplies received components belonging to first to $(N_B-1)^{th}$ partial blocks by $\exp(-j\hat{d}_q)$, as shown in equation 14 below.

$$z_{qS+s}=\exp(-j\hat{d}_q)y_{qS+s}(1 \le q \le N_B-1, 0 \le s \le S-1) \qquad (14)$$

Here, $Z_i$ represents a received component in which ICI has been mitigates.

Since phase noise is not completely removed by the process according to equation 14, $\{Z_i\}_{i=0}^{N-1}$ may still include phase noise.

The unremoved phase noise may be referred to as residual phase noise $\{\phi_i^R\}_{i=0}^{N-1}$.

Figure 5:
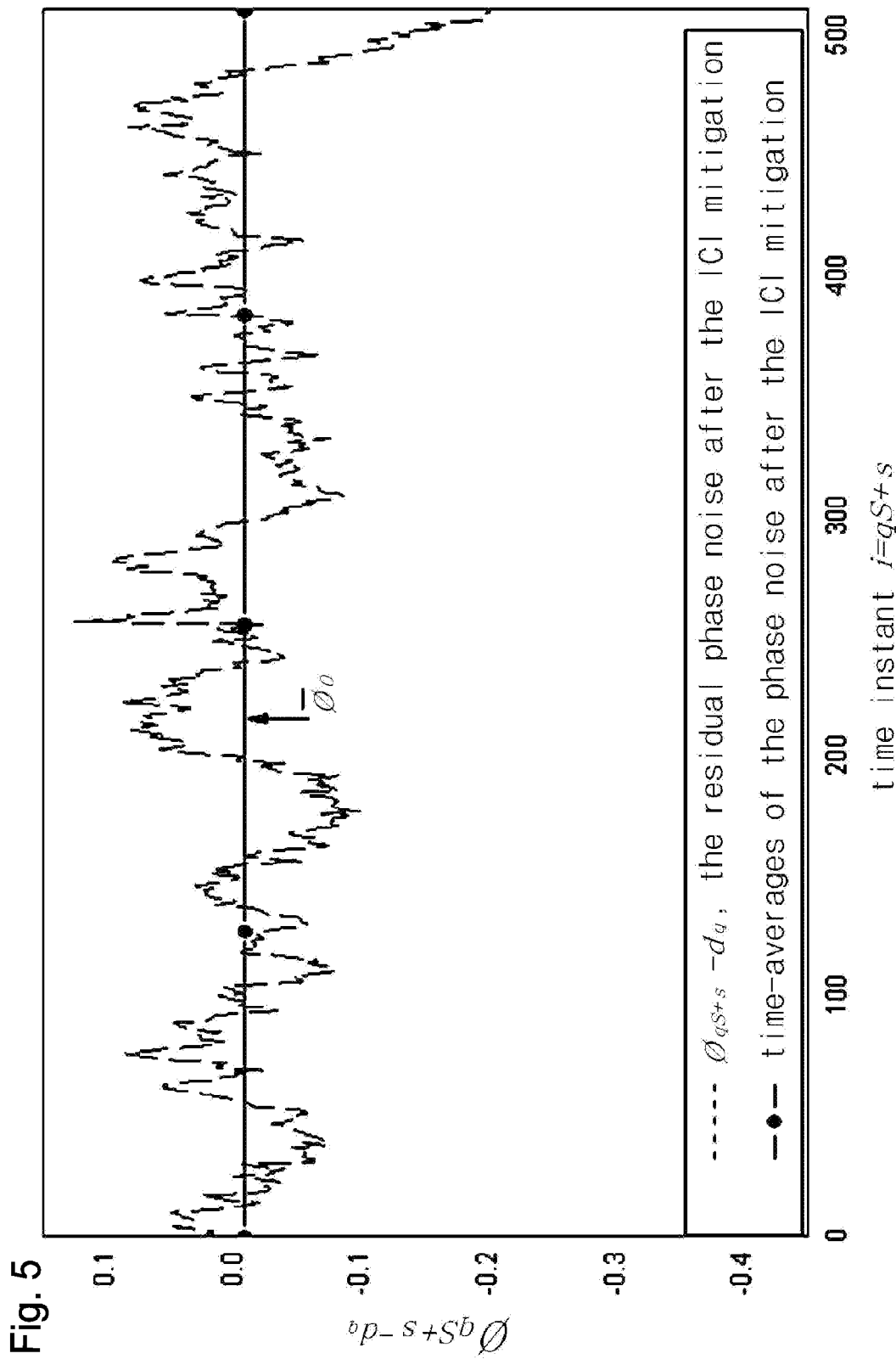
FIG. 5 is a waveform diagram showing residual phase noise occurring after ICI in a symbol has been mitigated.

FIG. 5 is a waveform diagram showing an example of residual phase noise, which the $Z_i$ has, when phase noise as shown in FIG. 3 is included in a symbol received to the receiving apparatus 200, a mean difference vector d of phase noise according to partial blocks in the symbol is accurately estimated, and the process according to equation 14 is applied.

Referring to FIG. 5, it can be understood that a change in the residual phase noise is very smaller than a change in the existing phase noise.

Generally, it has been known that the power of ICI is proportional to the degree of change in phase noise.

Therefore, the reduction of change in phase noise, after a process according to equation 14 is performed, represents that ICI can be remarkably mitigated.

In addition, when the estimator 242 of the ICI mitigation unit 240 has accurately estimated a mean difference vector d of phase noise according to partial blocks in the symbol, it can be easily confirmed that the mean of residual phase noise $\{\phi_i^R\}_{i=0}^{N-1}$ in the symbol is the mean $\bar{\phi}_0$ of the existing phase noise $\{\phi_s\}_{s=0}^{S-1}$ occurring in an $0^{th}$ partial block.

However, although a change in residual phase noise becomes very small to largely mitigate ICI, the mean of the residual phase noise may cause a CPE distortion to deteriorate the performance, and accordingly, it is additionally required to compensate therefor.

Hereinafter, a procedure of additionally estimating and compensating for a CPE at the ICI-mitigated symbol will be described.

The symbol ICI-mitigated by the ICI mitigation unit 240 according to the procedure of equations 1 to 14 is inputted to a second discrete Fourier transform unit 250, is transformed by a normalized N-point DFT through the second discrete Fourier transform unit 250, and is outputted to the CPE compensation unit 260.

That is to say, the ICI-mitigated symbol vector $z=[z_1, z_2, \ldots, z_{N-1}]^T$ is transformed into a frequency-domain symbol vector $Z=[Z_1, Z_2, \ldots, Z_{N-1}]^T$ by the normalized N-point DFT. In this case, a $k^{th}$ component $Z_k$ ($0 \le k \le N-1$) of the symbol vector Z is expressed as equation 15 below.

$$Z_k=J_0^R H_k X_k + D_k + \tilde{W}_k \qquad (15)$$

Here, $J_0^R$ represents a CPE caused by the residual phase noise distortion $\{\exp(\phi_i^R)\}_{i=0}^{N-1}$, which the ICI-mitigated symbol vector z has, and is expressed as equation 16 below.

$$J_0^R = \frac{1}{N}\sum_{i=0}^{N-1} \exp(j\phi_i^R) \qquad (16)$$

Here, $D_k$ represents ICI caused by residual phase noise, and $\tilde{W}_k$ represents an additional noise component to which $Z_k$ is subjected.

In this case, when a change in the residual phase noise is very small, ICI may be ignored.

In order for the receiving apparatus 200 to show an excellent performance, it is necessary to estimate and to compensate for $CPE(J_0^R)$.

Therefore, the CPE compensation unit 260 estimates and compensates for $CPE(J_0^R)$ with respect to the ICI-mitigated symbol vector Z.

In this case, the CPE compensation unit 260 estimates $CPE(J_0^R)$ with respect to the symbol vector Z in accordance with equation 17 below.

$$J_0^R = \exp(j\bar{\phi}_0) \qquad (17)$$

Here, an estimation value $\hat{\bar{\phi}}_0(k)$ for the mean $\bar{\phi}_0$ of phase noise from a $k^{th}$ component $Z_k$ may be calculated as shown in equation 18 below.

$$\hat{\bar{\phi}}_0(k) \angle (Z_k/H_k) - \angle(\mu[Z_k/H_k]) \qquad (18)$$

Here, $\mu[\cdot]$ represents a hard decision operation.

The CPE compensation unit 260 averages N number of estimation values $\{\hat{\bar{\phi}}_0(k)\}_{k=0}^{N-1}$ which has been calculated from $\{Z_k\}_{k=0}^{N-1}$ by equation 19 below, and finally, estimates $\bar{\phi}_0$.

$$\hat{\bar{\phi}}_0 = \frac{1}{N}\sum_{k=0}^{N-1}\hat{\bar{\phi}}_0(k) \tag{19}$$

After calculating an estimation value $\hat{\bar{\phi}}_0$ of the mean of phase noise, the CPE compensation unit 260 estimates transmitted components as equation 20 below using the one-tap equalization unit 270.

$$\hat{X}_k = \frac{\left(H_k \hat{J}_0^R\right)^*}{\left|H_k \hat{J}_0^R\right|^2 + \sigma_w^2} Z_k \tag{20}$$

Here, $\hat{X}_k$ represents an output of the one-tap equalization unit 270, $\hat{J}_o^R = \exp(j\hat{\bar{\phi}})$, and $\sigma_w^2$ represents the variance of a noise component $W_k$.

FIG. 6 is a flowchart illustrating a procedure in which a receiving apparatus mitigates phase nose in an OFDM communication system according to an embodiment of the present invention.

Referring to FIG. 6, the receiving apparatus 200 receives an OFDM symbol from the transmitting apparatus 100 in step S110.

The receiving apparatus 200 estimates a difference of the means of phase noise according to the partial blocks of the received symbol using the aforementioned procedure of equations 3 to 13 in step S120.

Then, the receiving apparatus 200 mitigates ICI occurring at the symbol using the estimated mean difference, as aforementioned in the process according to equation 13, in step S130.

Then, in step S140, the receiving apparatus 200 additionally estimates and compensates for a CPE occurring at the symbol, where ICI has been mitigated in advance, using equations 15 to 20 described above.

As described above, a phase noise mitigation algorithm for a receiving apparatus in an OFDM communication system according to an embodiment of the present invention does not use a pilot symbol at all, unlike the conventional algorithm.

Accordingly, an OFDM communication system employing the phase noise mitigation algorithm according to an embodiment of the present invention has a higher transmission efficiency than the conventional OFDM communication system using a pilot symbol.

In addition, a phase noise mitigation algorithm for a receiving apparatus in an OFDM communication system according to an embodiment of the present invention first mitigates ICI caused by phase noise, and thus has an excellent performance with respect to the intensities of phase noise in a wider range than the conventional scheme.

Although a preferred embodiment of the present invention has been described for illustrative purposes, those skilled in the art will appreciate that various modifications, additions and substitutions are possible, without departing from the scope and the spirit of the invention as disclosed in the accompanying claims.

The invention claimed is:

1. A receiving device of an orthogonal frequency division multiplexing (hereinafter, referred to as "OFDM") communication system, the receiving device comprising:

a communication unit for receiving an OFDM symbol from a transmitting apparatus in the OFDM communication system;

an intercarrier interference (hereinafter, referred to as "ICI") mitigation unit for estimating a mean difference of phase noise according to partial blocks of the received symbol, and mitigating ICI occurring at the symbol using the estimated mean difference; and a common phase error (hereinafter, referred to as "CPE") compensation unit for estimating and compensating for a CPE occurring at the symbol after the ICI is mitigated by the ICI mitigation unit.

2. The receiving device according to claim 1, wherein the ICI mitigation unit uses a blind scheme to estimate the mean difference of phase noise according to the partial blocks.

3. The receiving device according to claim 1, wherein the ICI mitigation unit uses at least one among a discrete Fourier coefficient according to the partial blocks, an amplitude of a channel coefficient, and an amplitude of a transmission component to estimate the mean difference of phase noise according to the partial blocks.

4. The receiving device according to claim 3, wherein the ICI mitigation unit applies a least-squares algorithm to the discrete Fourier coefficient according to the partial blocks, the amplitude of the channel coefficient, and the amplitude of the transmission component to estimate the mean difference of phase noise according to the partial blocks.

5. The receiving device according to claim 1, wherein the ICI mitigation unit multiplies each of the partial blocks of the symbol by a value corresponding to the estimated mean difference to mitigate the ICI.

6. The receiving device according to claim 1, wherein the ICI mitigation unit comprises:

a received symbol divider for dividing the received symbol into the partial blocks;

an estimator for calculating each of means of phase noise of the divided partial blocks, and estimating a mean difference of phase noise according to the partial blocks with respect to the calculated each phase noise mean; and an operator for mitigating the ICI by multiplying each of the partial blocks by a value corresponding to the mean difference which is estimated by the estimator.

7. A method for alleviating phase noise of a receiving device of an orthogonal frequency division multiplexing (hereinafter, referred to as "OFDM") communication system, the method comprising:

receiving an OFDM symbol from a transmitting apparatus in the OFDM communication system;

estimating a mean difference of phase noise according to partial blocks of the received symbol;

mitigating intercarrier interference (hereinafter, referred to as "ICI") occurring at the symbol using the estimated mean difference; and estimating and compensating for a common phase error (hereinafter, referred to as "CPE") occurring at the symbol after the ICI is mitigated at the symbol.

8. The method according to claim 7, wherein, in the estimating a mean difference, a blind scheme is used to estimate the mean difference of phase noise according to the partial blocks.

9. The method according to claim 7, wherein, in the estimating a mean difference, at least one among a discrete Fourier coefficient according to the partial blocks, an amplitude of a channel coefficient, and an amplitude of a transmission component is used to estimate the mean difference of phase noise according to the partial blocks.

10. The method according to claim 9, wherein, in the estimating a mean difference, a least-squares algorithm is applied to the discrete Fourier coefficient according to the partial blocks, the amplitude of the channel coefficient, and the amplitude of the transmission component to estimate the mean difference of phase noise according to the partial blocks.

11. The method according to claim 9, wherein, in the mitigating ICI, each of the partial blocks of the symbol is multiplied by a value corresponding to the estimated mean difference to mitigate the ICI.

* * * * *